United States Patent [19]
Ohta

[11] Patent Number: 5,875,260
[45] Date of Patent: *Feb. 23, 1999

[54] IMAGE PROCESSING APPARATUS AND METHOD FOR ALTERING COLOR IMAGE SIGNALS

[75] Inventor: Kenichi Ohta, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 549,213

[22] Filed: Oct. 27, 1995

[30] Foreign Application Priority Data

Oct. 31, 1994 [JP] Japan .................................. 6-267059

[51] Int. Cl.⁶ ................................................. G03F 3/08
[52] U.S. Cl. ....................... 382/162; 382/167; 358/520; 358/523; 358/525; 358/518
[58] Field of Search .................................. 358/523, 520, 358/518, 524, 519, 525, 504; 382/162, 167; 395/109; 345/431, 150

[56] References Cited

U.S. PATENT DOCUMENTS

| | | | |
|---|---|---|---|
| 5,438,649 | 8/1995 | Ruetz | 358/518 |
| 5,450,216 | 9/1995 | Kasson | 358/519 |
| 5,489,996 | 2/1996 | Oku et al. | 358/518 |
| 5,552,905 | 9/1996 | Tanaka | 358/523 |
| 5,594,558 | 1/1997 | Usami et al. | 358/518 |
| 5,699,491 | 12/1997 | Barzel | 395/109 |
| 5,724,442 | 3/1998 | Ogatsu et al. | 382/167 |
| 5,731,881 | 3/1998 | Wan et al. | 358/518 |
| 5,748,342 | 5/1998 | Usami | 358/523 |
| 5,801,855 | 9/1998 | Ohta | 358/518 |

*Primary Examiner*—Edward L. Coles
*Assistant Examiner*—Cheukfan Lee
*Attorney, Agent, or Firm*—Fitzpatrick, Cella, Harper & Scinto

[57] ABSTRACT

An input color signal is converted into a color signal representing a color which is visually closer to a color represented by the input color signal by performing gamut mapping processing based on the visual characteristics of humans. An image processing method includes the steps of inputting color signals, and performing gamut mapping processing in which the input color signal is converted into a color signal having a hue different from the hue of the input color signal based on a locus set corresponding to the hue and color saturation of the input color signal in color space.

10 Claims, 4 Drawing Sheets

IMAGE PROCESSING APPARATUS AND METHOD FOR ALTERING COLOR IMAGE SIGNALS

BACKGROUND OF THE INVENTION

1. Field of the Invention

This invention relates to an image processing method and apparatus for converting color separation signals into new color separation signals.

2. Description of the Related Art

Color CRT (cathode-ray tube) monitors, color hard copiers and the like are generally used as apparatuses for outputting visual color images.

A color CRT monitor forms a visual image according to an additive color mixture by modulating the intensities of emission levels of phosphors having three-color, i.e., R (red), G (green) and B (blue), coated on the surface of the monitor's tube. On the other hand, a color hard copier forms a color image on paper according to a subtractive color mixture using Y (yellow), M (magenta), C (cyan) and K (black) color materials.

The above-described two types of image display devices have different color reproduction capabilities in theory. As shown in FIG. 4, in general, the color CRT monitor has a wider color gamut than the color hard copier. Accordingly, an image displayed on the color CRT monitor cannot be faithfully reproduced by the color hard copier.

FIG. 4 illustrates color signals on an (a*, b*) plane by converting them into L*, a* and b* signals in a standard color space. In FIG. 4, reference numeral 301 represents a color gamut of a typical color CRT monitor, and reference numeral 302 represents a color gamut of a typical color printer.

When two colors represented by points A and B are present in an image, the image displayed on the color CRT monitor is reproduced in different colors. When providing a hard copy of the image, the colors at the points A and B are both reproduced as a color at a point C. Hence, the two colors cannot be discriminated from each other in the hard copy, and therefore information contained in the image is lost.

In order to solve such a problem, a method relating to gamut mapping is performed, in which when providing a hard copy of an input color image, color signals in the image are converted into signals so as to be within the color gamut of the obtained hard copy. That is, by performing conversion so that the points A and B are converted into points D and E shown in FIG. 4, the colors can be discriminated from each other on the hard copy.

In general, in order to cause colors reproduced on the hard copy to approach colors on the color CRT monitor as much as possible, conversion is performed based on hue elements of colors.

That is, conversion is performed so that hues of color signals in a uniform color space do not change after color conversion. More specifically, as shown in the second quadrant of FIG. 4, an input color signal is converted into a color signal present on a line obtained by connecting the origin and the input signal in a uniform color space. This is because the sense of incongruity in visual characteristics of man is small when a color displayed on the color CRT monitor and a color displayed on an output hard copy have the same hue, even though they have different color saturation values.

However, even if the two colors have the same hue in the uniform color space, the actually output color is not always seen to have the same hue by human eyes. For example, it is more preferable to shift a blue color (represented by a point P shown in FIG. 4) to a direction of green (as represented by a point R shown in FIG. 4) than preserving the same hue (as represented by a point Q shown in FIG. 4), because the obtained color is seen to be closer to the original color.

That is, there is a problem in that visual characteristics of humans do not coincide with theoretical values based on a uniform color space.

SUMMARY OF THE INVENTION

The present invention has been made in consideration of the above-described problems.

It is an object of the present invention to convert an input color signal into a color signal representing a color closer to a color represented by the input color signal by performing gamut mapping processing based on visual characteristics of a man.

It is another object of the present invention to perform high-quality conversion by performing conversion with a locus suitable for an input image.

According to one aspect, the present invention, which achieves these objectives, relates to an image processing method comprising the steps of inputting a color signal, and performing gamut mapping processing in which the input color signal is converted into a color signal having a hue different from a hue of the input color signal based on a locus set corresponding to the hue and saturation of the input color signal in a color space.

According to another aspect, the present invention relates to an image processing method comprising the steps of inputting color signals, and performing gamut mapping processing for each of the input color signals to be subjected to gamut mapping. The gamut mapping is performed based on a locus set corresponding to a hue of the input color signal in a color space.

According to still another aspect, the present invention relates to an image processing apparatus comprising input means for inputting a color signal, and gamut mapping processing means for performing gamut mapping processing in which the input color signal is converted into a color signal having a hue different from hue of the input color signal based on a locus set corresponding to the hue and color saturation of the input color signal in a color space.

According to yet another aspect, the present invention relates to an image processing apparatus comprising storage means for storing data indicating loci corresponding to a plurality of input image data values, generation means for generating data indicating a locus set corresponding to input image data based on the stored data indicating the loci and the input image data, and conversion means for converting the input image data based on the generated data indicating the locus set.

According to yet a further aspect, the present invention relates to an image processing method comprising the steps of storing data indicating loci corresponding to a plurality of input image data values, generating data indicating a locus set corresponding to input image data based on the stored data indicating the loci and the input image data, and converting the input image data based on the generated data indicating the locus set.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

First Embodiment

A first embodiment of the present invention will now be described in detail with reference to the drawings.

Figure 1:
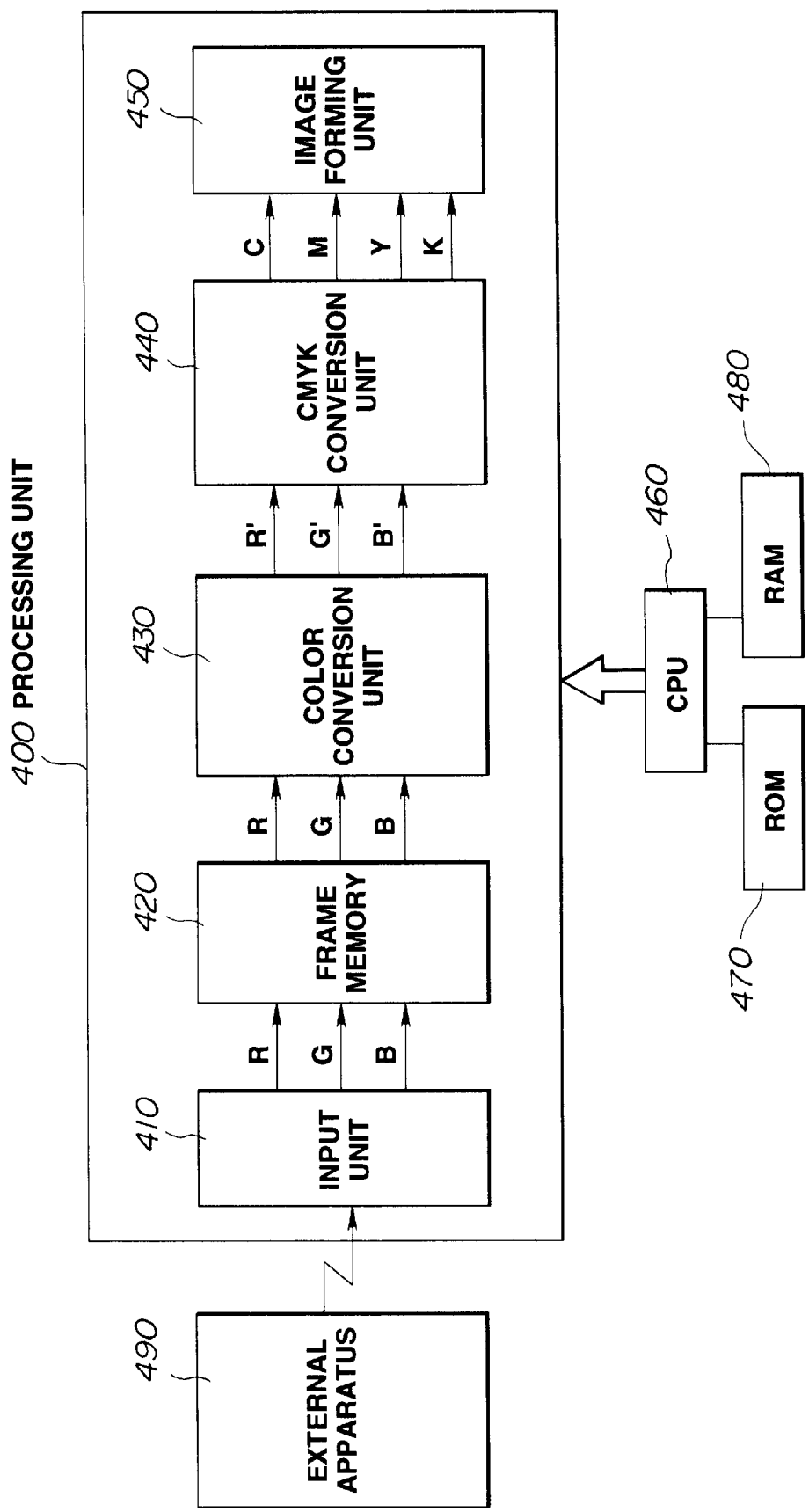
FIG. 1 is a block diagram illustrating the configuration of an image processing apparatus according to a first embodiment of the present invention.

FIG. 1 is a block diagram illustrating the configuration of an image processing apparatus according to the first embodiment.

In FIG. 1, a processing unit 400 receives image data representing an image displayed on a display unit of an external apparatus 490, such as a host computer or the like, from the external apparatus 490. The received image data is processed under the control of a CPU (central processing unit) 460 in order to form an image.

A description will now be provided of the processing unit 400.

An input unit 410 receives image data from the external apparatus 490, converts the input image data into R, G and B data, and outputs the R, G and B data. A frame memory 420 stores input R, G and B data for one image. The stored R, G and B data are read in synchronization with color conversion performed by a color conversion unit 430 under the control of the CPU 460. The color conversion unit 430 converts input R, G and B data into R', G' and B' data based on characteristics of an image forming unit 450. A CMYK conversion unit 440 converts the R',G' and B' data into C, M, Y and K data corresponding to C, M, Y and K recording materials used in the image forming unit 450. The image forming unit 450 forms an image on a recording medium based on the C, M, Y and K data.

The above-described processing in the processing unit 400 is controlled by the CPU 460.

The CPU 460 controls the processing using a RAM (random access memory) 480 based on programs stored in a ROM (read-only memory) 470.

Color conversion unit

Processing in the color conversion unit 430 will now be described in detail with reference to FIGS. 2 through 3(C).

Figure 2:
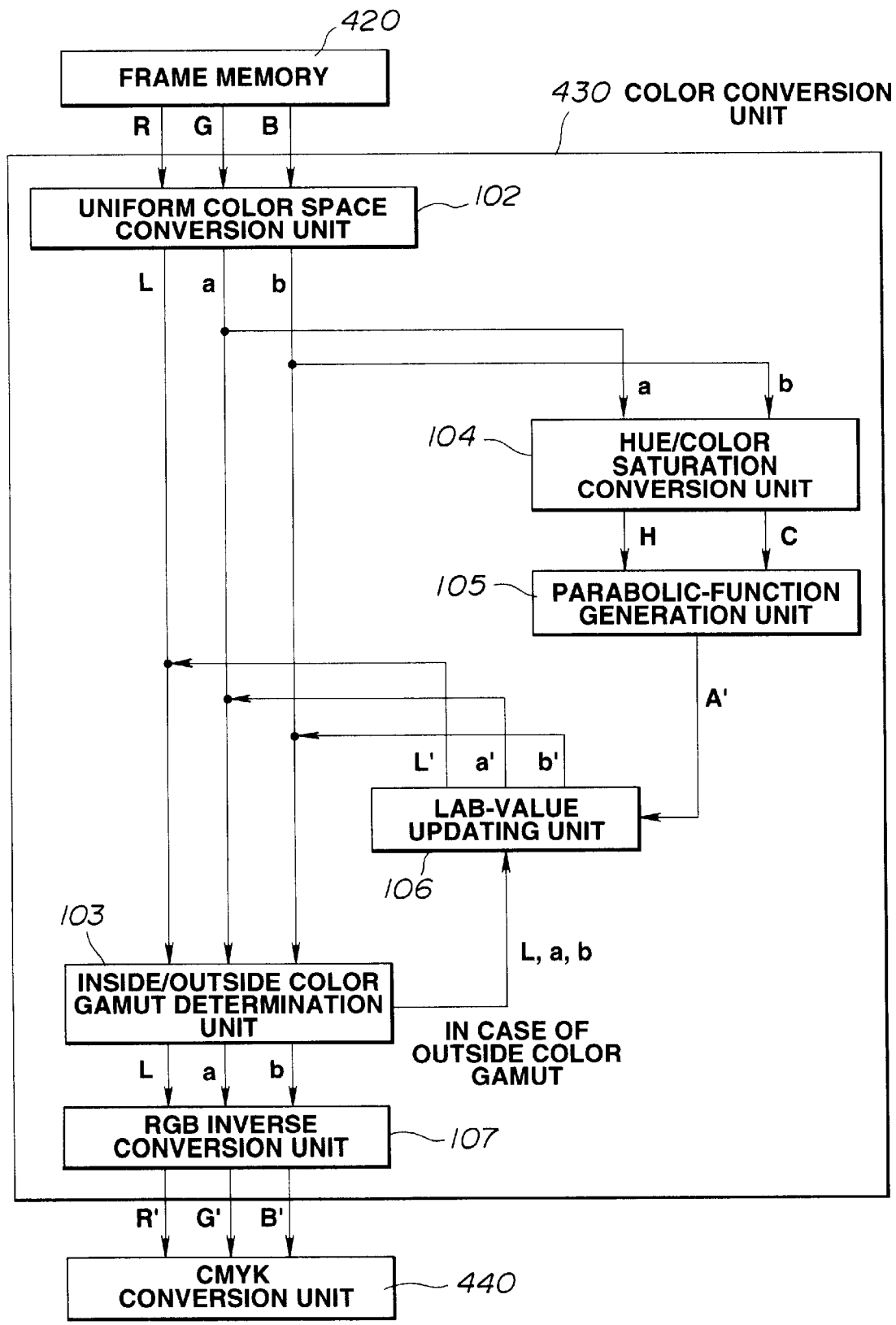
FIG. 2 is a block diagram illustrating the configuration of a color conversion unit shown in FIG. 1.

FIG. 2 is a block diagram illustrating an example of the configuration of the color conversion unit 430.

The CPU 460 reads R, G and B image signals for one pixel from the frame memory 420, and transmits the read image signals to a uniform color space conversion unit 102. The uniform color space conversion unit 102 converts the R, G and B signals into uniform color space signals L*, a* and b* signals according to the following expression (1):

$$\begin{cases} L^* = 116(Y/Y_0)^{1/3} - 16 \\ a^* = 500((X/X_0)^{1/3} - (Y/Y_0)^{1/3}) \\ b^* = 200((Y/Y_0)^{1/3} - (Z/Z_0)^{1/3}), \end{cases} \quad (1)$$

where $X = 0.6067R + 0.1736G + 0.2001B$ $Y = 0.2988R + 0.5868G + 0.1144B$ $Z = 0.0000R + 0.0661G + 1.1150B$, and $X_0$, $Y_0$ and $Z_0$ are X, Y and Z values of standard white.

An L*a*b* space is a uniform color space provided by the CIE (Commission Internationale de l'Eclairage), and is considered to substantially linearly correspond to visual characteristics of a man.

The L, a, and b signals obtained as a result of conversion by the uniform color space conversion unit 102 are transmitted to an inside/outside color gamut determination unit 103. At the same time, the a and b signals are transmitted to a hue/color saturation conversion unit 104.

The inside/outside color gamut determination unit 103 determines if the L, a and b signals are within the color gamut of the image forming unit 450 by referring to color gamut data indicating the color gamut, which is one of characteristics of the image forming unit 450, stored in the RAM 480 or ROM 470.

The color gamut data is stored within a profile indicating the characteristics of the image forming unit 450 in the RAM 480 or ROM 470. More specifically, the values of points corresponding to six primary colors, R, G, B, Y, M and C, and W and K are stored as the color gamut data.

Whether an input color signal is inside or outside the color gamut is determined by comparing the color gamut obtained by interpolating the above-described eight points with the input color signal.

The hue/color saturation conversion unit 104 converts the a and b signals into a hue signal H and a color saturation signal C according to the following expression (2):

$$\begin{cases} H = \arctan(b/a) \\ C = sqrt(a\,2 + b\,2) \end{cases}, \quad (2)$$

where H represents the angle of the input signal from the a* axis of the a and b coordinates, and C represents the distance from the origin.

By converting the a and b signals into the hue signal H and the color saturation signal C, an input color signal can be represented by two elements, i.e., hue and color saturation.

The H and C values obtained as a result of the conversion are input to a parabolic-function generation unit 105. First, a parameter A of a parabolic function expressed by the following expression (3) is determined:

$$y = A \cdot x \cdot (x-1) \quad (3),$$

where x and y are an input variable and an output variable, respectively.

The parameter A can, for example, be determined in the following manner.

Figure 3A:
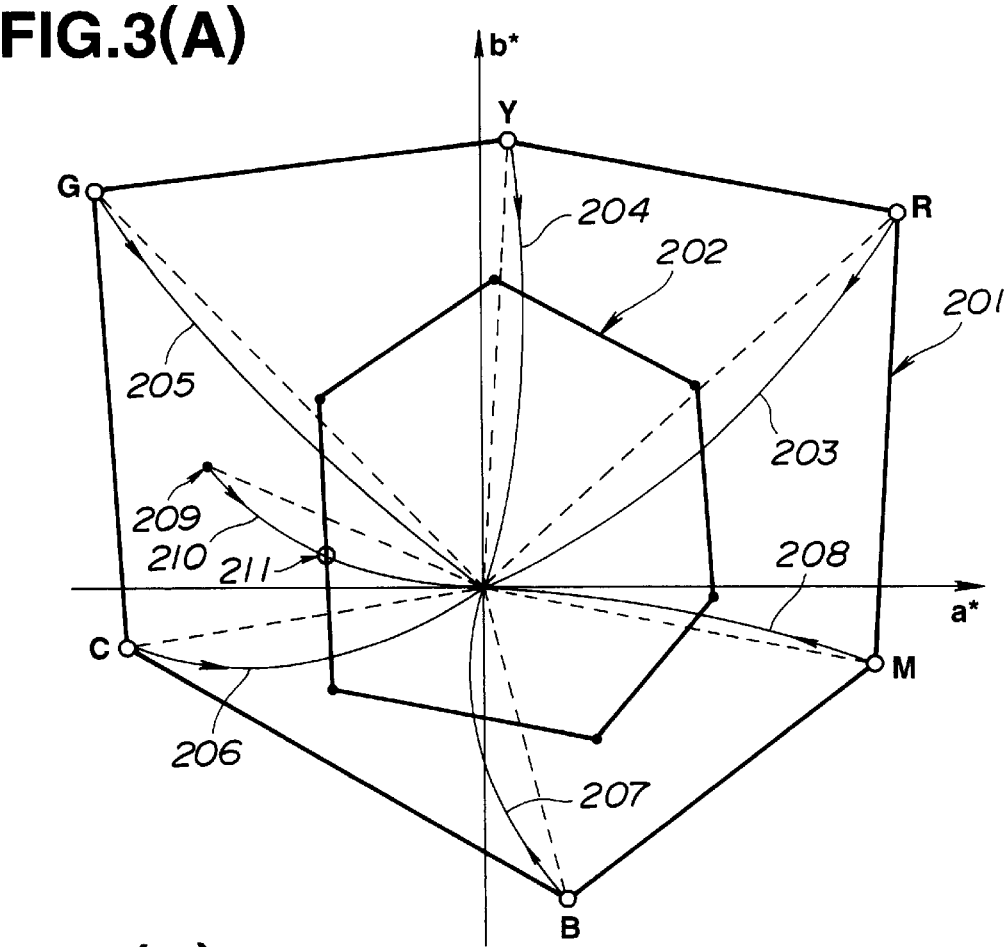
FIGS. 3(A) through 3(C) illustrate a parabolic function according to the first embodiment.

FIG. 3(A) illustrates gamut mapping using parabolic paths. In FIG. 3(A), reference numeral 201 represents the color gamut of a color CRT monitor, and reference numeral 202 represents the color gamut of a hard copy printer.

As shown in FIG. 3(A), the path of gamut mapping for each of primary colors R, G, B, Y, M and C stored in the RAM 480 as color gamut data is defined as a parabola.

Curves 203–208 shown in FIG. 3(A) represent parabolic functions for respective colors. An input color signal which has been determined to be outside the color gamut of the image forming unit 450 is compressed along the path of the corresponding curve in the direction of the arrow until the signal is inside the color gamut. Accordingly, if a parameter A is set for each hue, the direction of gamut mapping can be controlled for each hue.

Figure 3B:
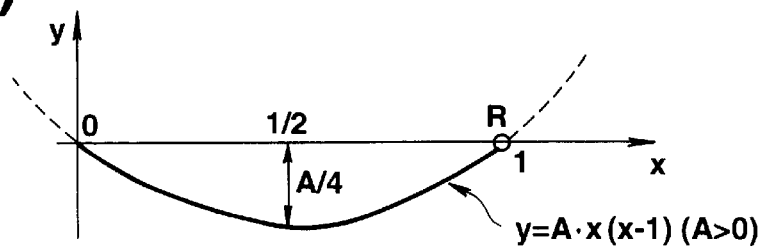

For example, if a line connecting the origin and the primary color R is taken as the coordinate axis, a parabolic function shown in FIG. 3(B) is obtained. When the parameter A has a positive value, the parabola is downwards convex, and has a greater curvature as the value A increases. When the parameter A has a negative value, the parabola is upwards convex, and has a greater curvature as the value A increases. That is, when the parameter A equals 0, gamut mapping is executed along a linear path while preserving the hue. When the parameter A has a positive value, the signal is compressed toward a hue at the right of an equihue line. When the parameter A has a negative value, the signal is compressed toward a hue at the left of the equihue line.

Figure 3C:
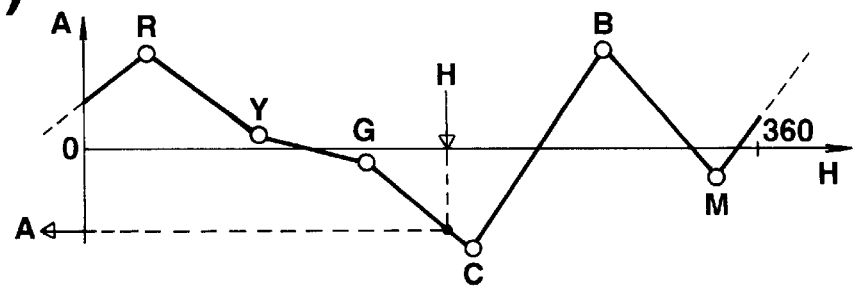

FIG. 3(C) illustrates values of the parameter A as a function of values of the hue H. In FIG. 3(C), points indicated by ○ represent values set in advance for the six primary colors. If the value H of the input signal is known, the value A corresponding to the hue of the input signal is obtained by performing linear interpolation between the set values as shown in FIG. 3(C).

Figure 4:
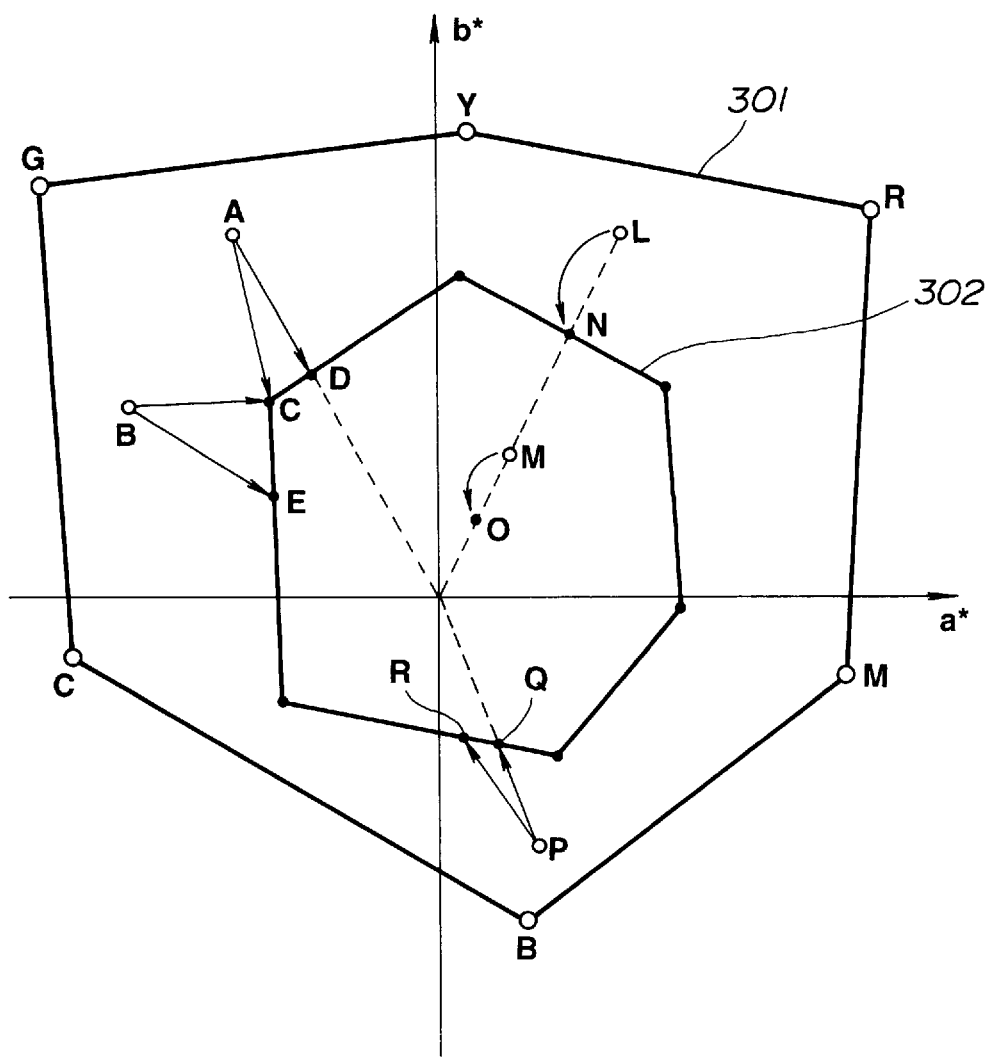
FIG. 4 is a diagram illustrating a difference in the color gamut between a CRT and a hard copy.

As described above, the direction of gamut mapping is set based on the hue of the input signal. Hence, as shown in FIG. 4, gamut mapping can be effected by shifting the hue of blue represented by a point P in the direction of green, i.e., in a positive direction (represented by R), and the obtained color is seen to be closer to the actual color than when effecting gamup mapping with the same hue.

That is, gamut mapping can be effected based on color appearance of the input color signal, i.e., an impression given to human eyes.

In the present embodiment, fringe gamut mapping, in which gamut mapping is effected only for input color signals outside the color gamut of the image forming unit, is adopted. Hence, correction based on color saturation is performed for the parameter A generated based on the hue of the input color signal.

That is, in order to cause the value A to approach 0 when the color saturation is low, a parameter A' obtained by correcting the value A with the color saturation C is set according to the following expression (4):

$$A' = A \times C / C_0 \qquad (4),$$

where $C_0$ is a predetermined normalizing constant.

By setting the normalizing constant $C_0$ based on the color gamut of the image forming unit, discontinuity in conversion of the input color signal produced in the vicinity of the boundary of the color gamut can be corrected.

By determining the parameter A' in accordance with the hue and the color saturation of the input signal in the above-described manner, the path of the gamut mapping is determined. For example, a path 210 is obtained for an input signal 209 shown in FIG. 3(A). L, a and b signals determined to be outside the color gamut by the inside/outside color gamut determination unit 103 are transmitted to a Lab-value updating unit 106, which performs gamut mapping by moving the signals along the path 210 determined by the parameter A toward the origin by a small amount. Obtained new L', a' and b' signals are returned to the inside/outside color gamut determination unit 103. Such updating processing is repeated until updated L', a' and b' signals enter the color gamut. When the signals enter the color gamut as indicated by reference numeral 211 in FIG. 3(A), obtained L, a and b signals are transmitted to an RGB inverse conversion unit 107. R', G' and B' signals obtained as a result of inversion conversion by the RGB inverse conversion unit 107 are output to a CMYK conversion unit 440.

As described above, according to the first embodiment, gamut mapping is effected based on a locus set based on the parameter A' of the parabolic function corresponding to the hue and the color saturation of the input color signal. Hence, it is possible to provide an output image signal having a color appearance closest to that of an input color image signal.

As shown in FIG. 3(A), in the first embodiment, each of loci 203–208 is a parabola set based on the hue of the corresponding color signal outside the color gamut in order to perform gamut mapping of the color signal in the direction of an achromatic color.

In the first embodiment, a locus corresponding to an input color signal can be generated by performing interpolation between stored loci of six primary colors.

Hence, according to the first embodiment, an input color signal which can be reproduced by the image forming unit 450 is faithfully reproduced, and an input color signal which cannot be reproduced by the image forming unit 450 can be reproduced by performing gamut mapping processing based on the hue of the input color signal.

That is, an input color signal within the color gamut can be faithfully reproduced, and an input color signal outside the color gamut can be reproduced to a color which is seen to be closest to the input color.

Modifications

Although in the first embodiment, a fringe gamut mapping method is adopted as a gamut mapping method, the present invention is not limited to such a method. For example, any other gamut mapping method, such as a uniform gamut mapping method or the like, may also be adopted.

In the uniform gamut mapping method, as shown in the first quadrant in FIG. 4, all input color signals are uniformly converted no matter when an input color signal is inside or outside the color gamut.

That is, a color represented by a point L outside the color gamut is converted into a color represented by a point N, and a color represented by appoint M inside the color gamut is converted into a color represented by a point O.

The uniform gamut mapping method differs from the fringe gamut mapping method in that conversion is performed for all input color signals, and therefore discontinuity is not produced as a result of the conversion.

Accordingly, when adopting the uniform gamut mapping method, gamut mapping may be performed based on the parameter A of the parabolic function obtained only based on the hue as shown in the above-described expression (3).

Of course, as in the case of the first embodiment, uniform gamut mapping may be performed based on the parameter A' of the parabolic function obtained based on the hue and the color saturation shown in the above-described expression (4).

Although in the first embodiment, all input color image signals are converted for each pixel, output R, G and B signals for input R, G and B signals may be instantaneously obtained by referring to a look-up table by executing in advance the above-described procedures for all combinations of the input R, G and B signals and storing R, G and B signals output after updating in the look-up table so as to correspond to the input signals.

That is, data of the values of the updated R, G and B signals may be written in addresses for combinations of the input R, G and B signals.

In order to execute such processing for all combinations of the input R, G and B signals, a memory having addresses exceeding 16 million is required in the case of an 8-bit signal value for each color. This is not a realistic approach. However, it is possible to adopt a well-known table conversion method in which only output values for combinations of significant 3–4 bits of input signals are stored in the memory, and other output values are obtained by performing linear interpolation between values stored in the memory.

Although in the first embodiment, the L*a*b* color space is used, any other color space, such as an L*u*v* color space, a YIQ color space or the like, may also be used.

Any device for performing image formation, such as an LBP (laser-beam printer), an ink-jet printer or the like, may be used as the image forming unit 450.

Furthermore, a device using a head for discharging liquid droplets by producing film boiling due to thermal energy may also be used.

Instead of inputting color signals from an external apparatus, color signals may be input from a reading unit, such as a CCD (charge-coupled device) or the like, provided in the user's own apparatus.

The parabolic loci are not limited to the ones described in the first embodiment, but any loci based on visual characteristics of a man may also be used.

Although in the first embodiment, the parameter A or A' for setting parabolic loci based on the hue and/or the color saturation of input image data is set, the present invention is not limited to such an approach. For example, parabolic loci may be set based on the hue, the color saturation and the luminance of input image data.

That is, stereoscopic gamut mapping may be performed using a parabolic path based on the hue, the color saturation and the luminance of input image data.

As described above, according to the above-described embodiments, gamut mapping processing based on color appearance can be executed by storing in advance loci for a plurality of representative points, generating a locus suitable for input image data from the stored loci, and performing gamut mapping.

Furthermore, since gamut mapping processing is performed using a locus based on visual characteristics of humans, a color signal representing a color closer to an input color can be obtained.

The present invention may be executed by supplying a system or an apparatus with programs. In such a case, a storage medium which stores programs for executing processing for respective components of the color coversion unit 430 constitutes the present invention. By reading a program from the storage medium to the system or the apparatus, the system or the apparatus performs a predetermined operation.

The individual components designated by blocks in the drawings are all well known in the image processing apparatus and method arts and their specific construction and operation are not critical to the operation or to a disclosure of the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A color image data processing method which performs color gamut mapping processing to color data, comprising the steps of:

storing mapping parameters set for a plurality of representative colors;

obtaining a mapping parameter corresponding to an input color from the stored mapping parameters based on the relation between a hue of the input color and a hue of the representative colors; and mapping the input color in a color gamut of an output device along a locus based on the mapping parameter.

2. A method according to claim 1, wherein the locus is non-linear.

3. A method according to claim 1, wherein the mapping parameter is obtained by interpolating the stored mapping parameters.

4. A method according to claim 1, wherein the mapping parameter is based on the hue and saturation of the color data, and is obtained by interpolating the stored mapping parameters.

5. A method according to claim 1, wherein the plurality of representative colors include R, G, B, C, M and Y.

6. A method according to claim 1, wherein color data outside of the color gamut is mapped at the boundary of the color data using the mapping parameter obtained.

7. A color image data processing device which performs color gamut mapping processing to color data, comprising:

storing means for storing mapping parameters set for a plurality of representative colors;

interpolating means for generating a mapping parameter based on the relation between a hue of an input color and a hue of the representative colors; and mapping means for mapping the input color in a color gamut of an output device along a locus based on the mapping parameter.

8. A storage medium storing information for a color image data processing method which performs color gamut mapping processing to color data comprising the steps of:

storing mapping parameters set for a plurality of representative colors;

obtaining a mapping parameter corresponding to an input color from the stored mapping parameters based on the relation between a hue of the input color and a hue of the representative colors; and mapping the input color in a color gamut of an output device along a locus based on the mapping parameter.

9. A storage medium according to claim 8, wherein the locus is non-linear.

10. A storage medium according to claim 8, wherein the mapping parameter is based on the hue of the color data and obtained by interpolating the mapping parameters stored.

* * * * *